United States Patent
Yang

(10) Patent No.: US 10,231,129 B2
(45) Date of Patent: Mar. 12, 2019

(54) MALICIOUS TEXT MESSAGE IDENTIFICATION

(71) Applicant: Lenovo (Beijing) Limited, Beijing (CN)

(72) Inventor: Da Ye Yang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 15/474,655

(22) Filed: Mar. 30, 2017

(65) Prior Publication Data
US 2017/0289815 A1 Oct. 5, 2017

(30) Foreign Application Priority Data
Mar. 31, 2016 (CN) .......................... 2016 1 0202078

(51) Int. Cl.
*H04W 12/12* (2009.01)
*H04W 4/14* (2009.01)
(Continued)

(52) U.S. Cl.
CPC ......... *H04W 12/12* (2013.01); *H04M 3/2281* (2013.01); *H04M 3/436* (2013.01); *H04W 4/14* (2013.01)

(58) Field of Classification Search
CPC ............. H04L 63/1425; H04L 63/1416; H04L 63/1441; H04L 63/145; H04L 2463/141; H04L 63/1408; H04L 51/12; H04L 63/0227; H04L 63/14; H04L 29/06; H04L 63/20; H04L 63/1433; H04L 67/02; H04L 63/06; H04L 63/083; H04L 63/0838; H04L 63/105; H04L 63/1458; H04L 67/22; H04L 9/3247; H04L 41/0866; H04L 41/142; H04L 41/5025; H04L 43/16; H04L 51/18; H04L 63/0428; H04W 52/0264; H04W 12/12; H04W 24/08; H04W 84/12;
(Continued)

(56) References Cited

U.S. PATENT DOCUMENTS

| 7,966,027 | B1 * | 6/2011 | Dudziak | ................. H04L 51/14 455/466 |
| 2009/0238088 | A1 * | 9/2009 | Tan | ..................... H04L 41/0631 370/252 |

FOREIGN PATENT DOCUMENTS

| CN | 101937466 B | * | 9/2010 |
| CN | 102541899 A |   | 7/2012 |

(Continued)

*Primary Examiner* — George Eng
*Assistant Examiner* — Jing Gao
(74) *Attorney, Agent, or Firm* — Ference & Associates LLC

(57) ABSTRACT

One embodiment provides a method, including: receiving, at an information handling device, a first predetermined data characteristic and a second predetermined data characteristic; receiving, at the information handling device, text data comprising a third predetermined data characteristic; comparing, using a processor, the third predetermined data characteristic with the first predetermined data characteristic and the second predetermined data characteristic; and determining, based on the comparing, whether the third predetermined data characteristic is associated with the first predetermined data characteristic or the second predetermined data characteristic. Other aspects are described and claimed.

10 Claims, 5 Drawing Sheets

(51) Int. Cl.
*H04M 3/436* (2006.01)
*H04M 3/22* (2006.01)

(58) Field of Classification Search
CPC ..... H04W 88/08; H04W 84/00; H04W 12/06;
H04W 4/14; H04W 4/60; H04W 4/70;
G06F 21/55; G06F 21/552; G06F 21/562;
G06F 9/505; G06F 21/54; G06F 21/56;
G06F 3/0481; G06F 17/2735; G06F
17/277; G06F 21/50; G06F 21/316; G06F
21/561; G06F 21/564; H04M 3/436;
H04M 3/2281
See application file for complete search history.

(56) References Cited

FOREIGN PATENT DOCUMENTS

| | | |
|---|---|---|
| CN | 103024746 A | 4/2013 |
| CN | 103313248 A | 9/2013 |
| CN | 103404086 A | 11/2013 |
| CN | 103874033 A | 6/2014 |
| CN | 104702492 A | 6/2015 |
| CN | 105404670 A | 3/2016 |

\* cited by examiner

US 10,231,129 B2

MALICIOUS TEXT MESSAGE IDENTIFICATION

CLAIM FOR PRIORITY

This application claims priority to Chinese Application No. 201610202078.0, filed on Mar. 31, 2016, which is fully incorporated by reference herein.

FIELD

The subject matter described herein relates to the technical field of text message services, more specifically, it relates to a method, apparatus and electronic device for identifying an abnormal text message.

BACKGROUND

Text message services are an indispensable constitutional part of mobile communication services. Presently, communication fraud is everywhere. Because supervision and monitoring vulnerabilities are present in communication networks, unauthorized abnormal text messages such as spam text messages, scam text messages and the like are surging, causing troubles and adverse impacts on user experience of the text message services.

BRIEF SUMMARY

In summary, one aspect provides a method, comprising: receiving, at an information handling device, a first predetermined data characteristic and a second predetermined data characteristic; receiving, at the information handling device, text data comprising a third predetermined data characteristic; comparing, using a processor, the third predetermined data characteristic with the first predetermined data characteristic and the second predetermined data characteristic; and determining, based on the comparing, whether the third predetermined data characteristic is associated with the first predetermined data characteristic or the second predetermined data characteristic.

Another aspects provides an information handling device, comprising: a processor; a memory device that stores instructions executable by the processor to: receive a first predetermined data characteristic and a second predetermined data characteristic; receive text data comprising a third predetermined data characteristic; compare the third predetermined data characteristic with the first predetermined data characteristic and the second predetermined data characteristic; and determine, based on the comparing, whether the third predetermined data characteristic is associated with the first predetermined data characteristic or the second predetermined data characteristic.

A further aspect provides a product, comprising: a storage device that stores code, the code being executable by a processor and comprising: code that receives a first predetermined data characteristic and a second predetermine data characteristic; code that receives text data comprising a third predetermined data characteristic; code that compares the data characteristic with the first predetermined data characteristic and the second predetermined data characteristic; and code that determines, based on the comparing, whether the data characteristic is associated with the first predetermined data characteristic or the second predetermined data characteristic.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Conventionally, it is generally identified whether a text message is normal or not according to the number of the text message sending party. For example, according to the tip-offs of the mobile phone numbers of the text messages made by users, the mobile phone number which has been reported as an unauthorized one for the number of times that exceeds a predetermined threshold is listed onto a blacklist of untrusted mobile phone numbers. In this way, when a user receives a text message sent from a mobile phone number on the blacklist, the text message is identified as an abnormal text message and a prompt is made to the user. In this manner, at the early stage of abnormal text message reporting (the number of report times does not exceeds the predetermined threshold) or in the case where a malicious user changes the mobile phone number, abnormal text messages such as the spam text messages, the scam text messages and the like may not be effectively identified. As a result, identification of the abnormal text message is subjected to a blind area, thus affecting the accuracy in identifying the abnormal text message.

Embodiment 1

Figure 1:
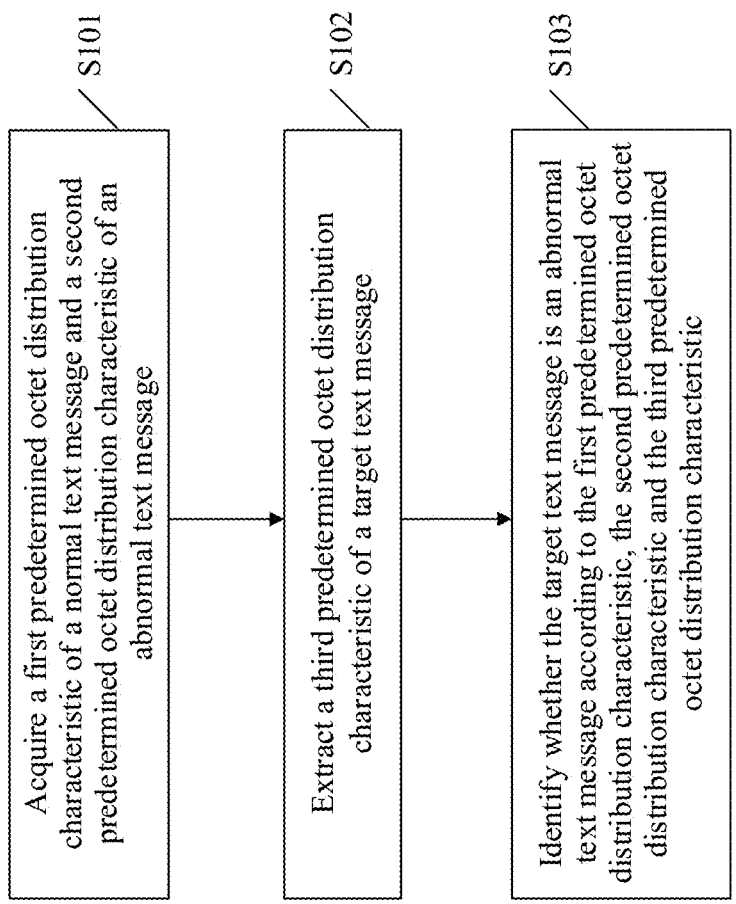
FIG. 1 is a schematic flow diagram illustrating a method for identifying an abnormal text message according to an embodiment.

Referring now to FIG. 1, a schematic flow diagram of a method for identifying an abnormal text message according to an embodiment is illustrated. In an embodiment, the method may be applied to an electronic device and the electronic device may be a terminal device such as a smart phone, a tablet computer and the like.

At S101, in an embodiment, a first predetermined octet distribution characteristic of a normal text message and a second predetermined octet distribution characteristic of an abnormal text message are acquired. The predetermined system may be a system such as binary, hexadecimal or the like. In an embodiment, the predetermined system is specifically hexadecimal.

Any text message corresponds to a corresponding hexadecimal octet sequence. In this embodiment, the hexadecimal octet distribution characteristic of the text message comprises: a first-order correlation probability between any two octets in a predetermined system sequence of the text message, which may be specifically represented by the following formula (1):

$$T = \begin{bmatrix} t_{0,0} & t_{0,1} & \cdots & t_{0,FF} \\ t_{1,0} & t_{1,1} & \cdots & t_{1,FF} \\ \vdots & \vdots & \ddots & \ddots \\ t_{FF,0} & t_{FF,1} & \cdots & t_{FF,FF} \end{bmatrix} \quad (1)$$

In the above formula, $t(k,l)$ represents the first-order correlation probability between an octet k and an octet l, wherein k and l pertain to [0, 255], and both k and l are integers.

Generally, in different hexadecimal octet sequences corresponding to different text message contents, first-order correlations between the octets of the different messages are different in terms of probability distribution, whereas normal text messages are significantly different from abnormal text messages such as spam text messages, scam text messages and the like in terms of content characteristic. Therefore, in the hexadecimal octet sequences, the normal text messages are greatly different from the abnormal text messages in terms of first-order octet correlation probability. In this way, the normal text message and the abnormal text message respectively have different hexadecimal octet distribution characteristics. With respect to T in formula (1), the first-order octet correlation probabilities of the normal text message and the abnormal text message respectively correspond to T in formula (1) having different values of $T_1$ and $T_2$.

Based on the above, in an embodiment, it is identified, according to the hexadecimal octet distribution characteristic of a text message, whether the text message is normal or not. Practice of the identification process needs hexadecimal octet distribution characteristics of the normal text message and the abnormal text message as a reference basis. Therefore, when a target text message is to be identified, a first hexadecimal octet distribution characteristic of the normal text message and a second hexadecimal octet distribution characteristic of the abnormal text message need to be firstly acquired.

At S102, in an embodiment, a third predetermined octet distribution characteristic of a target text message is extracted. In an embodiment, a third hexadecimal octet distribution characteristic of the target text message may be acquired by calculating a first-order correlation probability of any two octets in the hexadecimal octet sequence of the target text message, which may be specifically represented by a corresponding value $T_3$ of T in formula (1).

At S103, in an embodiment, it is identified whether the target text message is an abnormal text message or not according to the first predetermined octet distribution characteristic, the second predetermined octet distribution characteristic and the third predetermined octet distribution characteristic.

In an embodiment, the third hexadecimal octet distribution characteristic ($T_3$) of the target text message is respectively compared with the first hexadecimal octet distribution characteristic ($T_1$) of the normal text message and the second hexadecimal octet distribution characteristic ($T_2$) of the abnormal text message. Based on the comparison result, it is identified whether the target text message is normal or not.

In an embodiment, the method for identifying an abnormal text message comprises: acquiring a first predetermined octet distribution characteristic of a normal text message and a second predetermined octet distribution characteristic of an abnormal text message; extracting a third predetermined octet distribution characteristic of a target text message; and on this basis, identifying whether the target text message is an abnormal text message according to the first predetermined octet distribution characteristic, the second predetermined octet distribution characteristic and the third predetermined octet distribution characteristic. Accordingly, an embodiment provides a technical solution for identifying a text message based on the predetermined octet distribution characteristic thereof. During identification of the text message by using this technical solution, no identification blind area is present, therefore the accuracy in identifying an abnormal text message is effectively improved.

Embodiment 2

Figure 2:
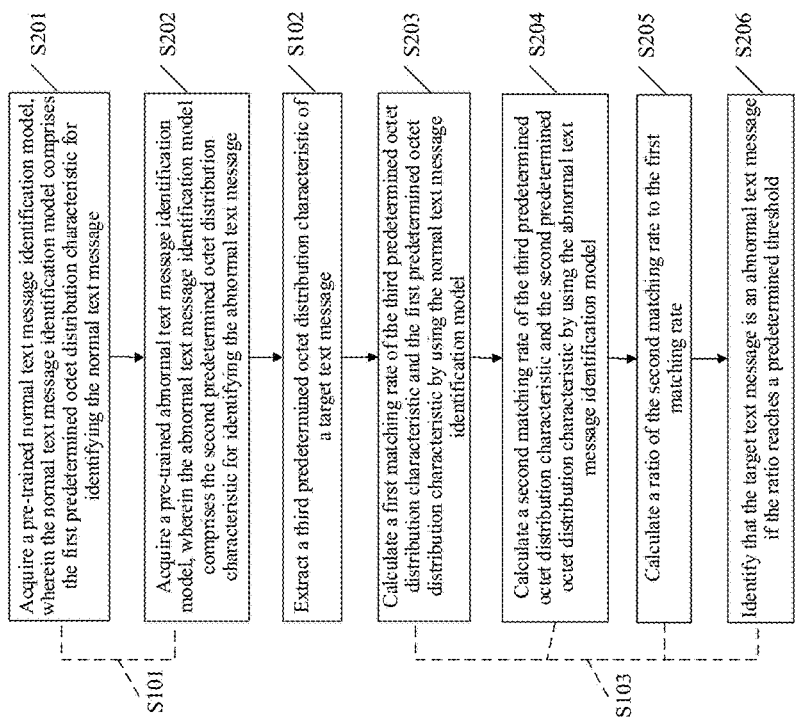
FIG. 2 is a schematic flow diagram illustrating a method for identifying an abnormal text message according to another embodiment.

Referring to FIG. 2, a schematic flow diagram of a method for identifying an abnormal text message according to an embodiment is illustrated. In an embodiment, step S101 may be implemented through the following steps S201 and S202.

At S201, an embodiment acquires a pre-trained normal text message identification model, wherein the normal text message identification model comprises the first predetermined octet distribution characteristic for identifying the normal text message.

At S202, an embodiment acquires a pre-trained abnormal text message identification model, wherein the abnormal text message identification model comprises the second predetermined octet distribution characteristic for identifying the abnormal text message.

In an embodiment, a specific number of normal text messages and a specific number of abnormal text messages are selected (the text messages may be manually marked as normal or not), and first-order discrete-time Markov models may be trained according to the hexadecimal octet distribution characteristics of the normal text messages and the abnormal text messages, thereby acquiring two models: a normal text message identification model and an abnormal text message identification model. The normal text message identification model comprises the first hexadecimal octet distribution characteristic for identifying the normal text message, and the abnormal text message identification model comprises the second hexadecimal octet distribution characteristic for identifying the abnormal text message. More specifically, the normal text message identification model and the abnormal text message identification model respectively comprise different values $T_1$ and $T_2$ of T in formula (1). Thus, when the target text message is to be identified, two pre-trained models serving as an identification basis may be acquired firstly: a normal text message identification model and an abnormal text message identification model.

Correspondingly, step S103 may be implemented through the following steps S203 to S206.

At S203, in an embodiment, a first matching rate of the third predetermined octet distribution characteristic and the first predetermined octet distribution characteristic is calculated by using the normal text message identification model.

At S204, in an embodiment, a second matching rate of the third predetermined octet distribution characteristic and the second predetermined octet distribution characteristic is calculated by using the abnormal text message identification model.

At S205, in an embodiment, a ratio of the second matching rate to the first matching rate is calculated.

At S206, in an embodiment, it is identified that the target text message is an abnormal text message if the ratio reaches a predetermined threshold. More particularly, a new text message received by an access layer of a terminal device such as a smart phone or the like may be used as the to-be-identified target text message. The new text message is respectively input into a normal text message identifying model and an abnormal text message identifying model. Afterwards, the normal text message identifying model calculates and outputs a first matching rate (or similarity) $\beta_1$ of the third hexadecimal octet distribution feature ($T_3$) and the first hexadecimal octet distribution feature ($T_1$) of the target text message. The abnormal text message identifying model calculates and outputs a second matching rate $\beta_2$ of the third hexadecimal octet distribution feature ($T_3$) and the second hexadecimal octet distribution feature ($T_2$) of the target text message.

Figure 3:
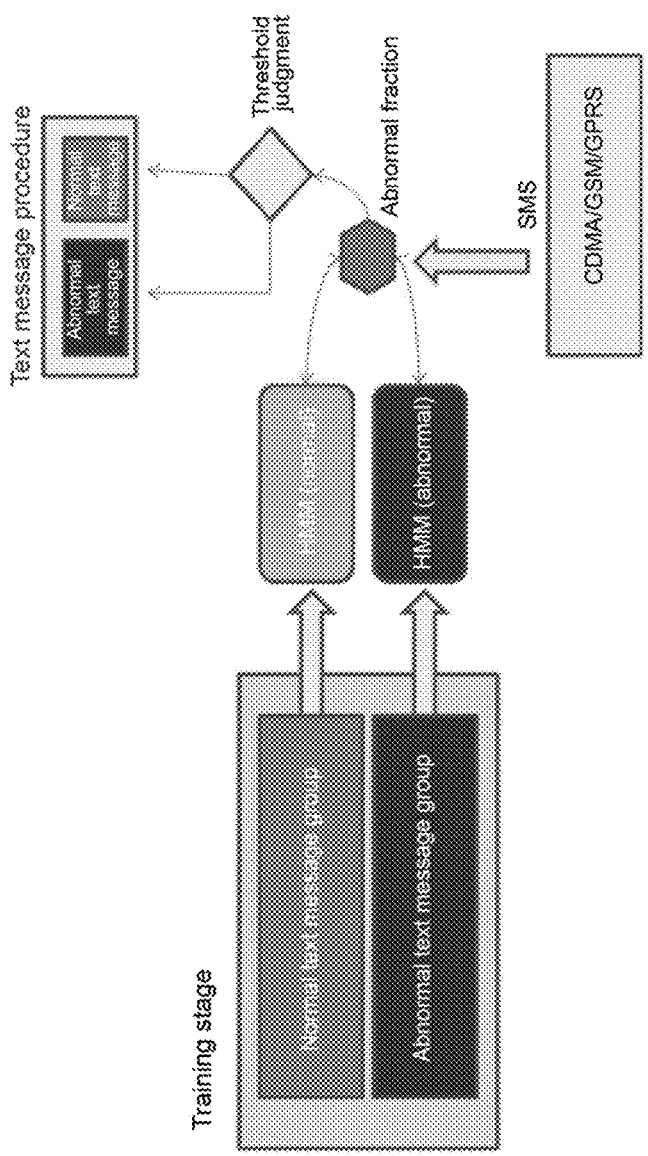
FIG. 3 is a schematic flow diagram illustrating the treatment process of identification model training and identification of a text message based on the trained identification model according to the embodiment in FIG. 2.

Based on the above, it is judged whether $\beta_2/\beta_1$ reaches a predetermined threshold. If $\beta_2/\beta_1$ reaches the predetermined threshold, it is identified that the target text message is an abnormal text message, otherwise, it is identified that the target text message is a normal text message. In this embodiment, the training of the identification model and the process of identifying the text message based on the trained identification model may be specifically referenced to FIG. 3.

Embodiment 3

Figure 4:
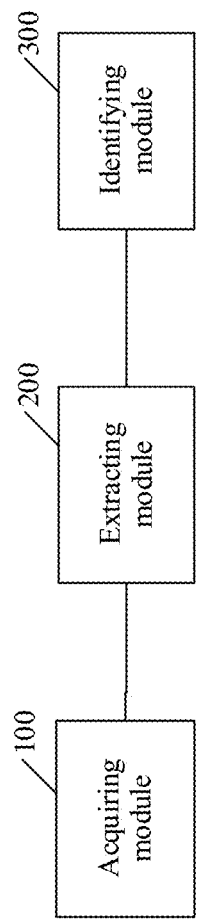
FIG. 4 is a schematic structural block diagram illustrating an apparatus for identifying an abnormal text message according to yet another embodiment.

Referring to FIG. 4, a schematic structural block diagram of an apparatus for identifying an abnormal text message according to an embodiment is illustrated. The apparatus may be implemented in an electronic device. The electronic device may be a terminal device such as a smart phone, a tablet computer and the like. As illustrated in FIG. 4, the apparatus may comprise: an acquiring module 100, an extracting module 200 and an identifying module 300. The acquiring module 100 is configured to acquire a first predetermined octet distribution characteristic of a normal text message and a second predetermined octet distribution characteristic of an abnormal text message. The predetermined system may be a system such as binary, hexadecimal or the like. In this embodiment, the predetermined system is specifically hexadecimal.

In an embodiment, any text message corresponds to a corresponding hexadecimal octet sequence. In this embodiment, the hexadecimal octet distribution characteristic of the text message comprises: a first-order correlation probability between any two octets in a predetermined system sequence of the text message, which may be specifically represented by the following formula (1):

$$T = \begin{bmatrix} t_{0,0} & t_{0,1} & \cdots & t_{0,FF} \\ t_{1,0} & t_{1,1} & \cdots & t_{1,FF} \\ \vdots & \vdots & \ddots & \ddots \\ t_{FF,0} & t_{FF,1} & \cdots & t_{FF,FF} \end{bmatrix}$$

In the above formula, t(k,l) represents the first-order correlation probability between an octet k and an octet l, wherein k and l pertain to [0, 255], and both k and l are integers.

Generally, in different hexadecimal octet sequences corresponding to different text message contents, first-order correlations between the octets of the different messages are different in terms of probability distribution, whereas normal text messages are significantly different from abnormal text messages such as spam text messages, scam text messages and the like in terms of content characteristic. Therefore, in the hexadecimal octet sequences, the normal text messages are greatly different from the abnormal text messages in terms of first-order octet correlation probability. In this way, the normal text message and the abnormal text message respectively have different hexadecimal octet distribution characteristics. With respect to T in formula (1), the first-order octet correlation probabilities of the normal text message and the abnormal text message respectively correspond to T in formula (1) having different values of $T_1$ and $T_2$.

Based on the above, in an embodiment, it is identified, according to the hexadecimal octet distribution characteristic of a text message, whether the text message is normal or not. Practice of the identification process needs hexadecimal octet distribution characteristics of the normal text message and the abnormal text message as a reference basis. Therefore, when a target text message is to be identified, a first hexadecimal octet distribution characteristic of the normal text message and a second hexadecimal octet distribution characteristic of the abnormal text message need to be firstly acquired.

In an embodiment, the extracting module 200 is configured to extract a third predetermined octet distribution characteristic of a target text message. A third hexadecimal octet distribution characteristic of the target text message may be acquired by calculating a first-order correlation probability of any two octets in the hexadecimal octet sequence of the target text message, which may be specifically represented by a corresponding value $T_3$ of T in formula (1). In an embodiment, the identifying module 300 is configured to identify whether the target text message is an abnormal text message according to the first predetermined octet distribution characteristic, the second predetermined octet distribution characteristic and the third predetermined octet distribution characteristic.

Based on the above processing, in this step, the third hexadecimal octet distribution characteristic ($T_3$) of the target text message is respectively compared with the first hexadecimal octet distribution characteristic ($T_1$) of the normal text message and the second hexadecimal octet distribution characteristic ($T_2$) of the abnormal text message, and it is identified, based on a comparison result, whether the target text message is normal or not.

As seen from the above technical solution, the apparatus for identifying an abnormal text message according to the present application impelements: acquiring a first predetermined octet distribution characteristic of a normal text message and a second predetermined octet distribution characteristic of an abnormal text message; extracting a third predetermined octet distribution characteristic of a target text message; and on this basis, identifying whether the target text message is an abnormal text message according to the first predetermined octet distribution characteristic, the second predetermined octet distribution characteristic and the third predetermined octet distribution characteristic. Accordingly, an embodiment provides a technical solution for identifying a text message based on the predetermined octet distribution characteristic thereof. During identification of the text message by using this technical solution, no identification blind area is present, therefore the accuracy in identifying an abnormal text message is effectively improved.

Embodiment 4

Figure 5:
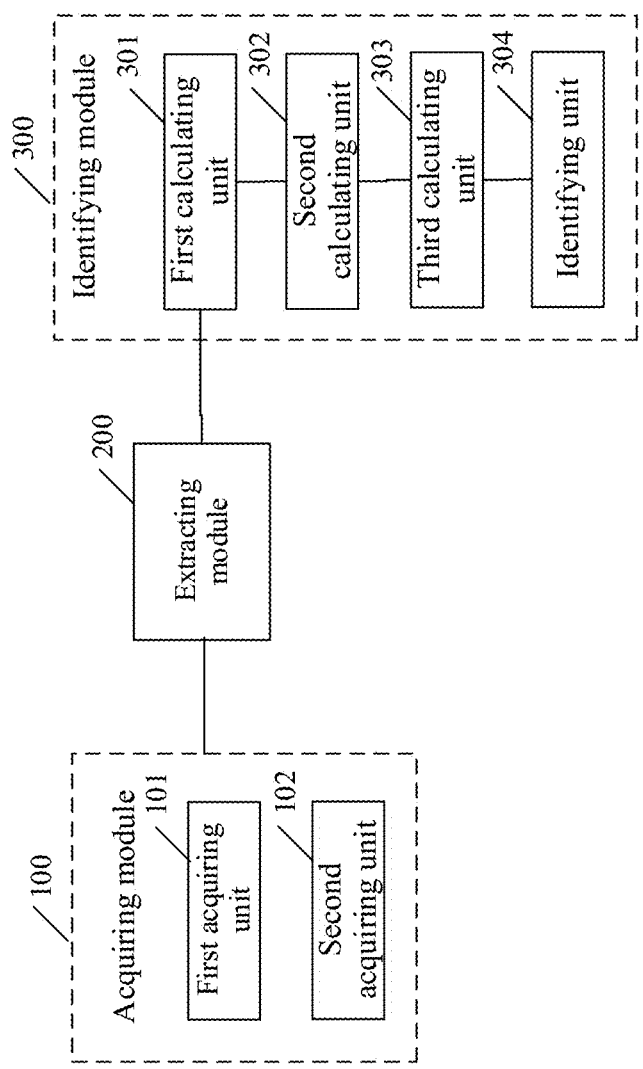
FIG. 5 is a schematic structural block diagram illustrating an apparatus for identifying an abnormal text message according to still yet another embodiment.

Referring to FIG. 5, a schematic structural block diagram of an apparatus for identifying an abnormal text message according to an embodiment is illustrated. In an embodiment, the acquiring module 100 comprises: a first acquiring unit 101 configured to acquire a pre-trained normal text message identification model. The normal text message identification model comprises the first predetermined octet distribution characteristic for identifying the normal text message and a second acquiring unit 102, configured to acquire a pre-trained abnormal text message identification model. The abnormal text message identification model comprises the second predetermined octet distribution characteristic for identifying the abnormal text message.

In an embodiment, a specific number of normal text messages and a specific number of abnormal text messages are selected (the text messages may be manually marked as normal or not), and first-order discrete-time Markov models may be trained according to the hexadecimal octet distribution characteristics of the normal text messages and the abnormal text messages, thereby acquiring two models: a normal text message identification model and an abnormal text message identification model. The normal text message identification model comprises the first hexadecimal octet distribution characteristic for identifying the normal text message and the abnormal text message identification model comprises the second hexadecimal octet distribution characteristic for identifying the abnormal text message.

In an embodiment, the normal text message identification model and the abnormal text message identification model respectively comprise different values $T_1$ and $T_2$ of T in formula (1). Thus, when the target text message is to be identified, two pre-trained models serving as an identification basis may be acquired firstly: a normal text message identification model and an abnormal text message identification model.

Correspondingly, referring to FIG. 5, the identifying module 300 comprises a first calculating unit 301, configured to calculate a first matching rate of the third predetermined octet distribution characteristic and the first predetermined octet distribution characteristic by using the normal text message identification model. The identifying module 300 may also comprise a second first calculating unit 302, configured to calculate a second matching rate of the third predetermined octet distribution characteristic and the second predetermined octet distribution characteristic by using the abnormal text message identification model. The identifying module 300 may also comprise a third calculating unit 303, configured to calculate a ratio of the second matching rate to the first matching rate. The identifying module 300 may also comprise an identifying unit 304, configured to identify that the target text message is an abnormal text message if the ratio reaches a predetermined threshold.

In an embodiment, a new text message received by an access layer of a terminal device such as a smart phone or the like may be used as the to-be-identified target text message, and the new text message is respectively input into a normal text message identifying model and an abnormal text message identifying model. Afterwards, the normal text message identifying model calculates and outputs a first matching rate (or similarity) flu of the third hexadecimal octet distribution feature ($T_3$) and the first hexadecimal octet distribution feature ($T_1$) of the target text message; and the abnormal text message identifying model calculates and outputs a second matching rate $\beta_2$ of the third hexadecimal octet distribution feature ($T_3$) and the second hexadecimal octet distribution feature ($T_2$) of the target text message.

Based on the above, it is judged whether $\beta_2/\beta_1$ reaches a predetermined threshold. If $\beta_2/\beta_1$ reaches the predetermined threshold, it is identified that the target text message is an abnormal text message. Otherwise, it is identified that the target text message is a normal text message. In this embodiment, the training of the identification model and the process of identifying the text message based on the trained identification model may be specifically referenced to FIG. 3.

Embodiment 5

In an embodiment, an electronic device is disclosed. The electronic device may be a terminal device such as a smart phone, a tablet computer and the like. The electronic device comprises the apparatus for identifying an abnormal text message disclosed in Embodiment 3 or Embodiment 4.

As seen from the above technical solution, the electronic device according to an embodiment acquires a first predetermined octet distribution characteristic of a normal text message and a second predetermined octet distribution characteristic of an abnormal text message, extracts a third predetermined octet distribution characteristic of a target text message, and on this basis, identifies whether the target text message is an abnormal text message according to the first predetermined octet distribution characteristic, the second predetermined octet distribution characteristic and the third predetermined octet distribution characteristic. Accordingly, an embodiment provides a technical solution for identifying a text message based on the predetermined octet distribution characteristic thereof. During identification of the text message by using this technical solution, no identification blind area is present; therefore the accuracy in identifying an abnormal text message is effectively improved.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving a first predetermined data characteristic and a second predetermined data characteristic, wherein the first predetermined data characteristic is associated with a preapproved data set and the second predetermined data characteristic is associated with an abnormal data set;
   receiving text data comprising a third predetermined data characteristic;
   comparing, using a processor, the third predetermined data characteristic with the first predetermined data characteristic and the second predetermined data characteristic, wherein the comparing comprises calculating a first matching coefficient and a second matching coefficient, wherein the first matching coefficient is calculated by comparing the third predetermined data characteristic with the first predetermined data characteristic and the second matching coefficient is calculated by comparing the third predetermined data characteristic with the second predetermined data characteristic;
   determining, based on the comparing, whether the third predetermined data characteristic is associated with the first predetermined data characteristic or the second predetermined data characteristic, wherein the determining comprises determining that the third predetermined data characteristic is associated with the second predetermined data characteristic in response to the second matching coefficient is higher than the first matching coefficient; and
   blocking the text data in response to the third predetermined data characteristic is determined to be associated with the second predetermined data characteristic.

2. The method of claim 1, further comprising allowing a user to view the text data if the third predetermined data characteristic is determined to be associated with the first predetermined data characteristic.

3. The method of claim 1, further comprising updating the first predetermined data characteristic and the second predetermined data characteristic.

4. The method of claim 1, further comprising storing the first predetermined data characteristic and the second predetermined data characteristic at a storage location.

5. The method of claim 1, wherein the first predetermined data characteristic and the second predetermined data characteristic comprise a hexadecimal system.

6. An information handling device, comprising:
   a processor;
   a memory device that stores instructions executable by the processor to:
   receive a first predetermined data characteristic and a second predetermined data characteristic, wherein the first predetermined data characteristic is associated with a preapproved data set and the second predetermined data characteristic is associated with an abnormal data set;
   receive text data comprising a third predetermined data characteristic;

compare the third predetermined data characteristic with the first predetermined data characteristic and the second predetermined data characteristic, wherein the compare comprises calculating a first matching coefficient and a second matching coefficient, wherein the first matching coefficient is calculated by comparing the third predetermined data characteristic with the first predetermined data characteristic and the second matching coefficient is calculated by comparing the third predetermined data characteristic with the second predetermined data characteristic;

determine, based on the comparing, whether the third predetermined data characteristic is associated with the first predetermined data characteristic or the second predetermined data characteristic, wherein the determine comprises determining that the third predetermined data characteristic is associated with the second predetermined data characteristic in response to the second matching coefficient is higher than the first matching coefficient; and block the text data in response to the third predetermined data characteristic is determined to be associated with the second predetermined data characteristic.

7. The information handling device of claim 6, wherein the instructions are further executable by the processor to allow a user to view the text data if the third predetermined data characteristic is determined to be associated with the first predetermined data characteristic.

8. The information handling device of claim 6, wherein the instructions are further executable by the processor to update the first predetermined data characteristic and the second predetermined data characteristic.

9. The information handling device of claim 6, wherein the instructions are further executable by the processor to store the first predetermined data characteristic and the second predetermined data characteristic at a storage location.

10. A product, comprising:

a storage device that stores code, the code being executable by a processor and comprising:

the code that receives a first predetermined data characteristic and a second predetermine data characteristic, wherein the first predetermined data characteristic is associated with a preapproved data set and the second predetermined data characteristic is associated with an abnormal data set;

the code that receives text data comprising a third predetermined data characteristic;

the code that compares the data characteristic with the first predetermined data characteristic and the second predetermined data characteristic, wherein the compare comprises calculating a first matching coefficient and a second matching coefficient, wherein the first matching coefficient is calculated by comparing the third predetermined data characteristic with the first predetermined data characteristic and the second matching coefficient is calculated by comparing the third predetermined data characteristic with the second predetermined data characteristic;

the code that determines, based on the comparing, whether the data characteristic is associated with the first predetermined data characteristic or the second predetermined data characteristic, wherein the determine comprises determining that the third predetermined data characteristic is associated with the second predetermined data characteristic in response to the second matching coefficient is higher than the first matching coefficient; and the code that blocks the text data in response to the third predetermined data characteristic is determined to be associated with the second predetermined data characteristic.

* * * * *